US005894052A

United States Patent [19]

Sawyer

[11] Patent Number: 5,894,052

[45] Date of Patent: Apr. 13, 1999

[54] CHEMICAL GROWTHS DISPLAY APPARATUS

[76] Inventor: George M. Sawyer, 7251 Garden Grove Blvd., Suite E, Garden Grove, Calif. 92641

[21] Appl. No.: 08/821,059

[22] Filed: Mar. 20, 1997

Related U.S. Application Data

[63] Continuation of application No. 08/671,588, Jun. 28, 1996, abandoned, which is a continuation of application No. 08/299,436, Sep. 1, 1994, abandoned.

[51] Int. Cl.$^{6}$ .......... B32B 33/00

[52] U.S. Cl. .......... 428/542.2; 428/542.6; 428/15

[58] Field of Search .......... 428/15, 19, 542.2, 428/542.6, 905

[56] References Cited

U.S. PATENT DOCUMENTS

| | | | |
|---|---|---|---|
| 308,950 | 12/1884 | Chalvin . | |
| 1,511,588 | 10/1924 | Bleecker . | |
| 1,757,943 | 5/1930 | Mesa . | |
| 1,881,423 | 10/1932 | Favreau . | |
| 2,067,731 | 1/1937 | Prochazka . | |
| 2,128,760 | 8/1938 | Shapiro . | |
| 2,129,563 | 9/1938 | Bublitz . | |
| 2,760,052 | 8/1956 | Owen . | |
| 4,196,239 | 4/1980 | Sawyer | 428/17 |

*Primary Examiner*—Marie Yamnitzky
*Attorney, Agent, or Firm*—William W. Haefliger

[57] ABSTRACT

The method of displaying chemical growths and employing structure having a first portion to contact a solution capable of forming the growths when the solution is dried, the structure also having an intermediate portion to feed the solution by wicking action from the first portion, and the structure also having a display portion to which the solution is fed from the intermediate portion and on which the growths form when the solution is fed thereto and dried, the improvement that includes modifying at least one of the portions to control the feeding of the solution.

20 Claims, 4 Drawing Sheets

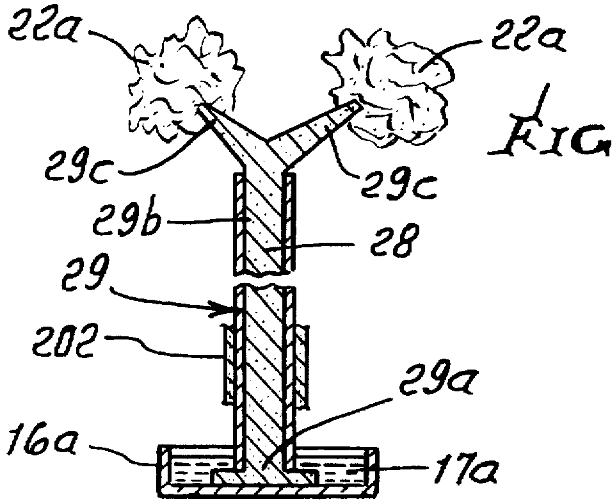
FIG. 5.
FIG. 7.
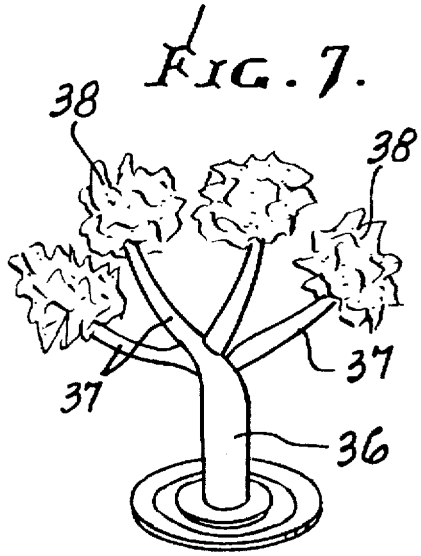
FIG. 6.
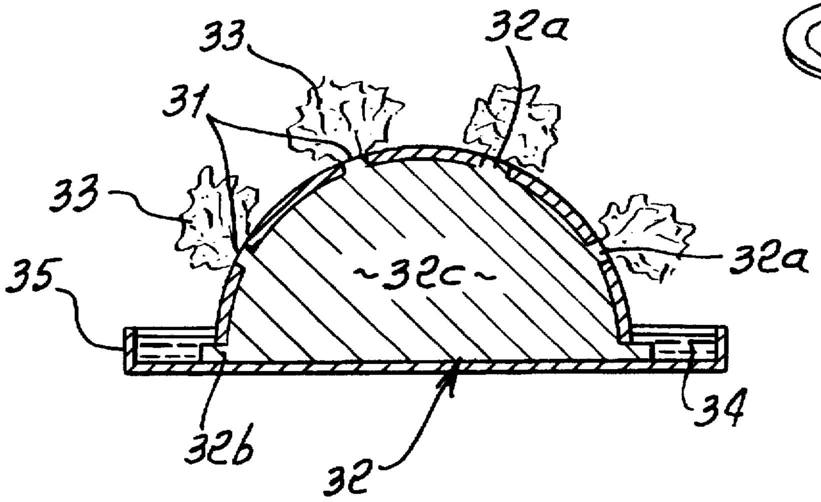
FIG. 8.
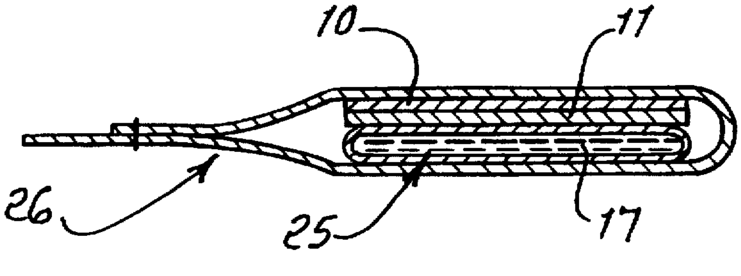

CHEMICAL GROWTHS DISPLAY APPARATUS

This application is a continuation of U.S. application Ser. No. 08/671,588, filed Jun. 28, 1996, now abandoned, which is a continuation of U.S. application Ser. No. 08/299,436, filed Sep. 1, 1994, now abandoned.

BACKGROUND OF THE INVENTION

This invention relates generally to chemical growth displays, and more particularly concerns modifying or controlling the formation of decorative chemical growths on display objects.

In my U.S. Pat. No. 4,196,239, I have disclosed a unique method and means for effectively and ornamentally displaying plant-like chemical growths, as for example on simulated vegetation, such as plants, trees, etc. There is need for modifying or controlling such chemical growths, as for example preventing or blocking growth on certain areas of the display object, and accelerating growth formation on the display object. Other type modifications are also needed and contemplated herein.

PRIOR ART

Prior art products sold to the public for many years by New Tomorrow, Inc., 7251 Garden Grove Blvd., Suite E, Garden Grove, Calif. 92641, comprise products with the following trademarks: Magic Christmas Tree™, Magic Tree™, Magic Garden™. The dyes, chemicals, and other materials used, and the methods of their use and means of their manufacture, are prior art to this application. Said products contain an absorbent artistic display apparatus for chemical growths in air (display means), and a package of chemical granules. These products work in essentially the same way: the granules are dissolved in water, forming a solution, and said solution is placed in a dish, such as a saucer. Alternately, a pouch of solution has been used wherein the granules are already dissolved in water; in other words, a package of solution is provided rather than a package of granules.

The display means (which is an absorbent artistic display apparatus, or simply, a "display apparatus") is assembled and placed in the solution. The solution is absorbed by the lower portion and conducted to the display portion by wicking action of the intermediate portion. The display portion commonly comprises pointed extremities upon which chemical growths occur. The dye is located at the extreme tips of some of the pointed extremities; and, when the absorbent material is white, the color of the dye at the extremities is approximately the same as the colors of the chemical growths that take place at these locations.

SUMMARY OF THE INVENTION

Basically, the method of the present invention contemplates displaying chemical growths by employing means having a first portion to contact a solution capable of forming the growths when the solution is dried, the means also having an intermediate portion to feed the solution by wicking action from the first portion, and the means also having a display portion to which the solution is fed from the intermediate portion and on which the growths form when the solution is fed thereto and dried. The contemplated improvement includes modifying at least one of such portions to control the feeding of the solution.

As will appear, such modification may include providing barrier means on at least one of the portions for blocking the chemical growths at the barrier means. The barrier means may comprise a cutout on the display means in the path of solution wicking to the display zone; or it may comprise an auxiliary object or substance adhered to or applied to a portion of the display means. Such an object may comprise a stripe of nonwicking substance impregnated in the display means in the form of an otherwise wicking sheet. The sheet may take the form of an animal, vegetation, fish, or other natural object.

The barrier means may be applied to the object as by dipping into a solution of the nonwicking substance, or by brushing or swabbing that substance onto an area of the sheet selected to inhibit wicking travel of the chemical solution to the display zone.

These and other objects and advantages of the invention, as well as the details of an illustrative embodiment, will be more fully understood from the following specification and drawings, in which:

DRAWING DESCRIPTION

FIGS. 1 and 2 are elevations showing sheet form means to display plant-like chemical growths;

FIG. 2*a* is an enlarged elevation of a sheet tip;

FIGS. 5 and 6 are elevations, in section, showing other forms of the invention;

FIG. 7 is an elevation of yet another form of the invention;

FIG. 8 shows a package to contain the FIGS. 1 and 2 means, plus growth solution, in a sealed plastic package;

DETAILED DESCRIPTION

Figure 1:
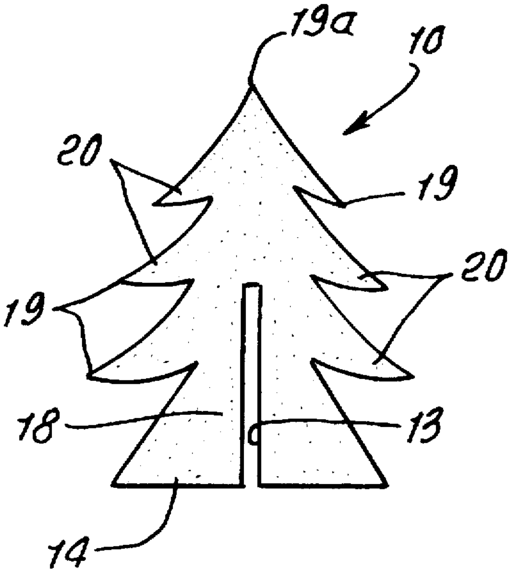
Figure 2:
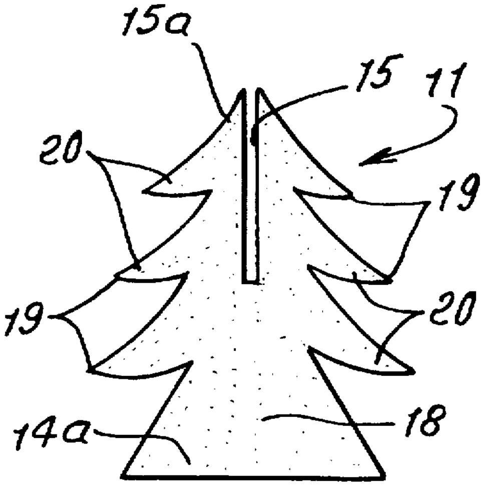

In my prior U.S. Pat. No. 4,196,239, I have disclosed or describe a display means in the form of first and second sheets (see FIGS. 1–3) in evergreen tree shape, capable of interfitting to extend in intersecting planes, as is clear from FIG. 3. Sheet 10 has a vertical slot 13 extending upwardly from its base portion 14, while sheet 11 has a vertical slot 15 extending downwardly from its top portion 15*a*. The slots are sufficiently narrow to allow slide assembly of the two sheets by causing the slot 15 to endwise register with slot 13, and then relatively vertically sliding the sheet together. Slot edges or shoulders on one sheet interfit the other sheet.

Figure 3:
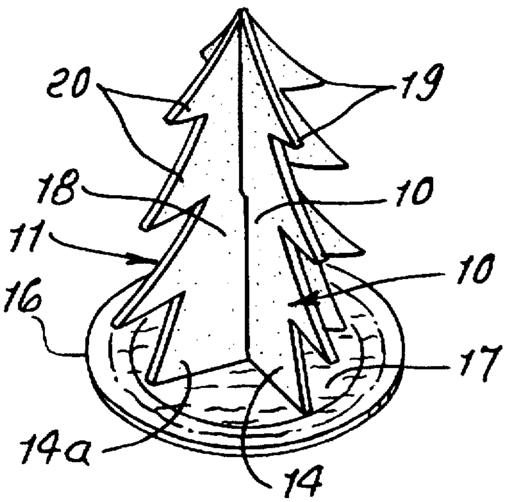
FIG. 3 is a perspective showing the FIGS. 1 and 2 means in assembled condition.

FIG. 3 shows the assembled tree with lower or base portions 14 and 14*a* standing in a shallow receptacle 16 to contact a solution 17 capable of forming the growths when the solution is dried. Each sheet 10 and 11 has an intermediate portion 18 that acts as a wick to draw the solution up by capillary action and feed the solution upwardly so that it permeates the sheet. For that purpose, the sheets may consist of dark colored blotter paper material, as for example is produced by Eastman Kodak, Rochester, N.Y.

Also, each sheet has projecting tips to which the solution from the intermediate portion is fed, to form the intended growths when the solution fed to such tips dries and the chemical growths form. Note the tips 19 on the ends of laterally tapering tree branches 20, and the tip 19*a* at the tree top. Thus, each sheet or both sheets constitute a means to display plant-like chemical growths.

Figure 2A:
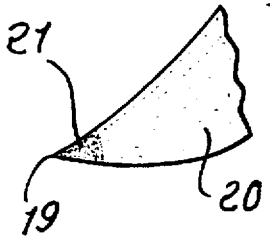
Figure 4:
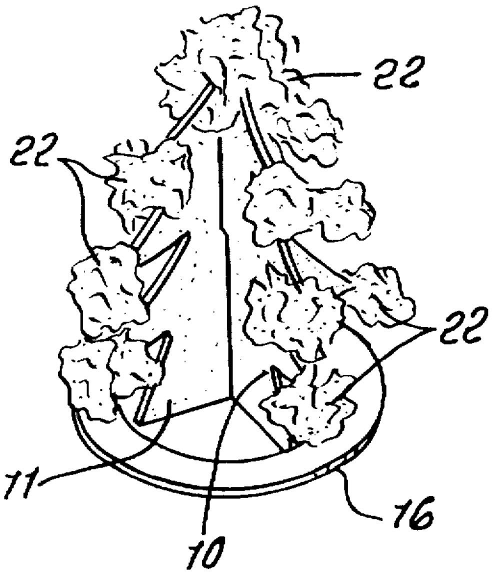
FIG. 4 is an elevation showing the growths that form on the FIG. 3 means.

FIG. 2*a* shows dye 21 impregnating a tip portion of a branch 20, and via which solution passes, by wicking action, to the tip 19. Such dye acts to color the solution passing to the tip, as for example red, blue, yellow, etc. As a result, the growths that form on the tips, as seen in FIG. 4 at 22, are colored, and a surprise factor would result if the viewer cannot predict the colors of the different growths. Prior art does not create a surprise when absorbent material is white. Typical dyes are blue and yellow food coloring, produced by McCormick & Co., Baltimore, Md. Other colors are usable, and these specific dyes are representative only.

Referring to FIG. 8, the two sheets 10 and 11 are stored in parallel, adjacent relation, along with a flat, plastic, sealed packet 25 which contains an amount of solution 17 sufficient to grow the growths seen in FIG. 4. The assembly is enveloped by a card or other enclosure 26, for display and/or shipment.

The growths 22 have fine, complex, crystalline form, and typically appear frosty, plant-like, or fur-like. The solution typically consists essentially of an alkaline salt, ammonia, and water. One prior art representative solution to produce the growths is formulated as follows:

6 tablespoons of sodium chloride (Morton's)

1 tablespoon of ammonia (Star Bros., Colton, Calif.)

6 tablespoons of water 6 tablespoons of (liquid) laundry bluing (Mrs. Stewart's Liquid Bluing, a product of Luther Ford Products Co., Minneapolis, Minn.).

The ingredients are thoroughly mixed and enough is poured into the receptacle 16 to maintain the base portions 14 and 14*a* wetted as the growths form.

Another means to display plant-like chemical growth appears in FIG. 5 to have a protective shell 28, in the form of a tube (such as a polyethylene straw), within which the wicking material 29 is filled. The wick has a lower portion 29*a* to contact solution 17*a* in receptacle 16*a*; an intermediate portion 29*b* to feed liquid solution upwardly to display perlein comprising projecting tips 29*c* projecting free of shell 28. Growths 22*a* form on the tips, in a manner similar to growths 22 discussed above, and dye may be located at the tips. The wick 29 may consist of blotter material, fibrous material, cellulosic material, or any other suitable liquid wicking substance.

In FIG. 6, the protective shell 30 is dome-like and contains perforations at 31 to expose the tips 32*a* of the wicking material 32. Solution is fed from the material base or lower portion 32*b* via intermediate portion 32*c* to the tips. Growths 33 form at the tips, as shown, and dye may be located at the tips to color the growths. The solution 34 is contained by receptacle 35.

In FIG. 7, the display means includes a central trunk 36 and branches 37, with growths 38 at the ends of the branches. The trunk and branches may have the shell and wick construction seen in FIG. 5.

In accordance with the present invention, there is provided the step of modifying at least one of the solution contacting, intermediate or display portions of the overall display means, to control feeding of solution to the display portion.

As will be seen, such modification may include delaying, blocking or accelerating solution wicking to the display portion, to enhance the effectiveness of the overall display.

Referring now to the present invention, one way to provide for modification of the means to display chemical growths is to control solution feed, as for example from the solution supply to a first portion of that means, or to control solution feed via an outer, moderate portion of that means, or to control solution feed to the display portion of that means. Such control may, for example, be delay of solution feed, or selective blocking of such feed, or acceleration of such feed, or other types of control.

Figure 9:
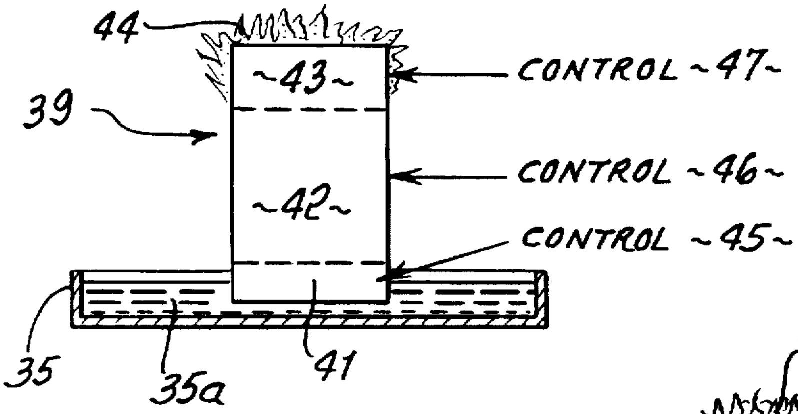
FIG. 9 is an elevation showing modification or control of a wicking means.

FIG. 9 illustrates the principle, in which the means to display chemical growths is designated generally at 39 (as "display means"), and has a first portion 41 to contact the supply solution 35*a* (as for example like solution 34) in a receptacle 35; and a second or intermediate portion 42 to feed, i.e., wick, the solution from the first portion 41; and a display portion 43, to which solution is fed from portion 42, and on which chemical growths take form, as indicated at 44.

Modification of means 39 may then, for example, include control at 45 of portion 41, and/or control at 46 of portion 42, and/or control at 47 of portion 43.

Figure 10:
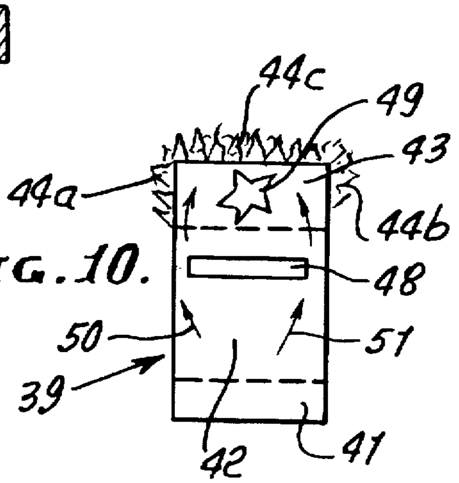
FIG. 10 is like FIG. 9 but showing use of a control barrier.

FIG. 10 shows one form of control 46 to comprise providing a barrier to solution wicking or flow. The barrier takes the form of a cutout 48 in portion 42, forcing the wicking of the solution around the barrier, as indicated by arrows 50 and 51, thus slowing the flow, and resulting in a changed pattern of chemical growth on portion 43 of means 39 (for example, more growths at 44*a* and 44*b* than at 44*c*). Means 39 may comprise sheet or sheets, as disclosed above for FIGS. 1–7. Cutting may be carried out by methods comprising the application of electromagnetic radiation (focusing a heat source), when the source is a laser; an incandescent filament; or an arc discharge, for example; or by die cutting employing a steel rule die, or by punch-through discs.

FIG. 10 may also represent provision of a barrier at 49 in the form of a printed area of desired shape (trees, ornament, etc.) of the barrier. That barrier is on the display portion 43, and prevents formation of chemical growths over the barrier area. Printable (or otherwise applicable) substances include:

a) hydrocarbon b) wax c) isoparaffinic hydrocarbon and fluoroaliphatic resin, d) printed substance e) resin-like material f) nonresin like material.

Application methods of the barrier material to the absorbent material may be carried out as by:

a) dipping b) brushing c) spraying d) printing e) silk screening f) sponging.

Dipping of an edge of sheet portion 42 or 43 is found to be easy and especially useful.

The barrier 48 may take any of a variety of shapes, i.e., animal, vegetable, etc.

Figure 11:
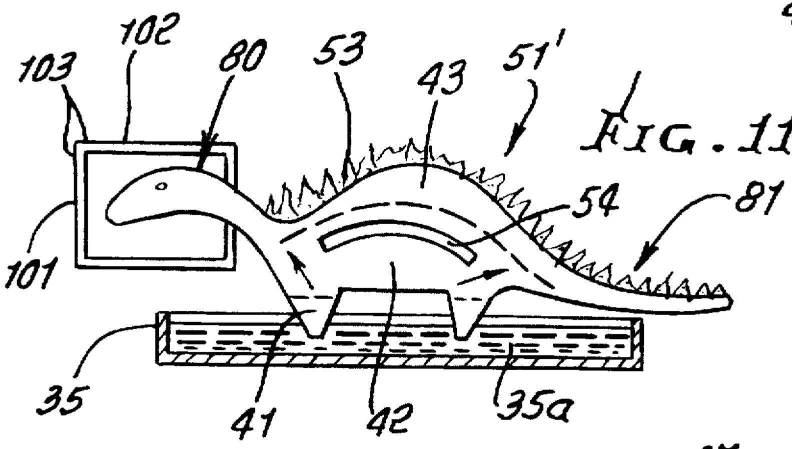
FIGS. 11 and 12 show control of wicking on animal and vegetable forms.
Figure 12:
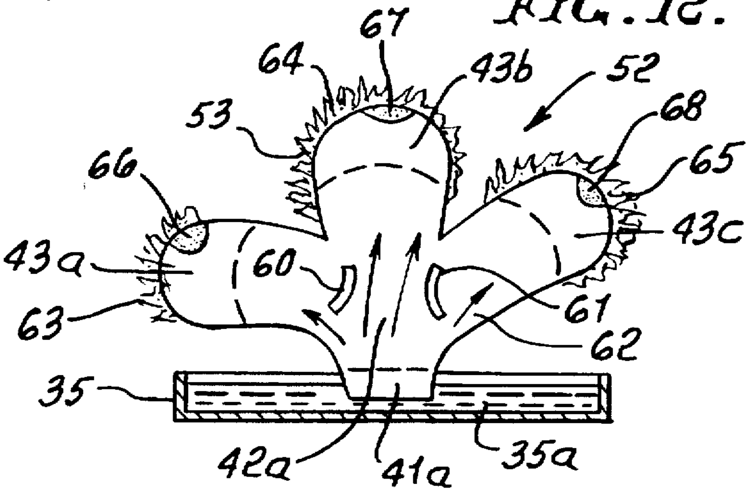
Figure 13:
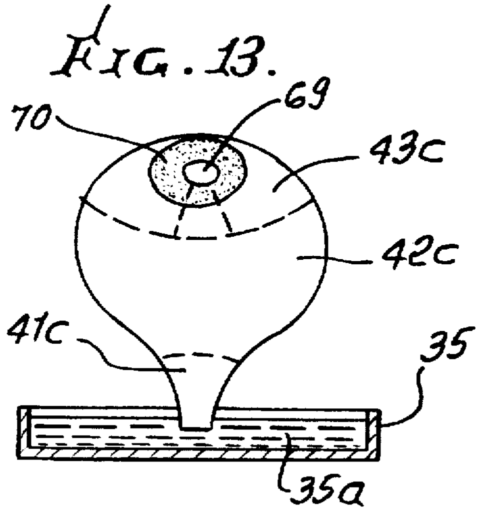
FIG. 13 is an elevation showing a modification.

FIG. 11 shows an animal form 51, and FIG. 12 is a cactus-like vegetable form 52, each with crystal growths 53 on edges of zone 43. Note in FIG. 11 the printed stripe 54 (or cutout) acting as a barrier to force solution to wick toward the head and tail of the dinosaur replica, and also to flow around the barrier toward the upper back. This modulates or controls solution flow to obtain desired crystal growth extents at the head, tail and back of the animal. The barrier also serves to create detail that defines the artistic design.

In FIG. 12, the curved barriers 60 and 61, printed on the vegetable-shaped wicking sheet 62, force solution to wick-flow around the barriers, and upwardly therebetween toward display lobes 43*a*, 43*b*, and 43*c*, from intermediate portion 42*a*. Note the controlled crystal growths at 63, 64, and 65 on the lobes, influenced by barrier use or placement. Printed on ornamental barriers 66–68 on the lobes prevent crystal growths thereon, and may, for example, represent colored fruit.

SURPRISE EFFECT BY LOCAL APPLICATION OF A MASKING COLOR

When the display means is made of a dark colored, absorbent material, as paper, and the projecting tips are dyed, the color of the dyes is masked from view partially or completely by the dark color. Now, when the growths appear, the colors of the growths are a surprise. This is the case of prior art when dark green absorbent paper was used. However, when the display means is made of light colored or white absorbent material, the color of the dyed tips is not masked, the dye colors are obvious, and the resulting colors of the chemical growths are essentially the same as the colors that appear on the tips. Hence, there is no surprise.

How, then, is one to create a surprise at the colors that develop in the chemical growths at the projecting tips when white (or light colored) absorbent material is used? A way has been discovered to create a surprise effect, even if white paper is used.

By referring to FIG. 2*a*, the branch of the tree tip 19 is impregnated with dye 21, which is a "dye of color different from the color that the colored chemical growths are to assume".

Summarizing, this is how a surprise effect is accomplished, even if white paper is used. The tip 19 is dyed by a dark color that is water insoluble. This dark color is called the "masking color". The water soluble dye is then applied to the tip 19, and the masking color either partially or completely masks the color of the water soluble dye that imparts color to the chemical growths on the tip 19.

Because of its function, the masking color is a "dye of color different from the color that the colored chemical growths are to assume". An example of the use of a masking color to create a surprise effect, when the color of the absorbent material is white, is to color the tip of branch 19 black by dyeing it with a marking pen that marks with waterproof colors (as with a Marks-A-Lot brand marking pen). Note: What is created is a masking color that is localized in position, as at the tip 19, rather than universally coloring the absorbent material, as is the case for colored paper of prior art. After applying the water insoluble masking color, water soluble dye is applied, according to prior art, which can be picked up by the solution as it travels to the tips and forms chemical growths. An example is yellow dye. Now, when one observes the tip of the branch, it appears black, even though it is impregnated within with yellow dye. When the display means is activated, the colorless solution (as it travels through the black appearing absorbent material that is impregnated with yellow dye) picks up the yellow dye and carries it to the tip, where the yellow dye is incorporated within the chemical growths that form at the tips. Thus, a surprise effect is created, even though white paper is used.

EXAMPLES OF GROWTH CONTROL AT FIRST, SECOND, AND THIRD PORTIONS OF DISPLAY MEANS

Figure 16:
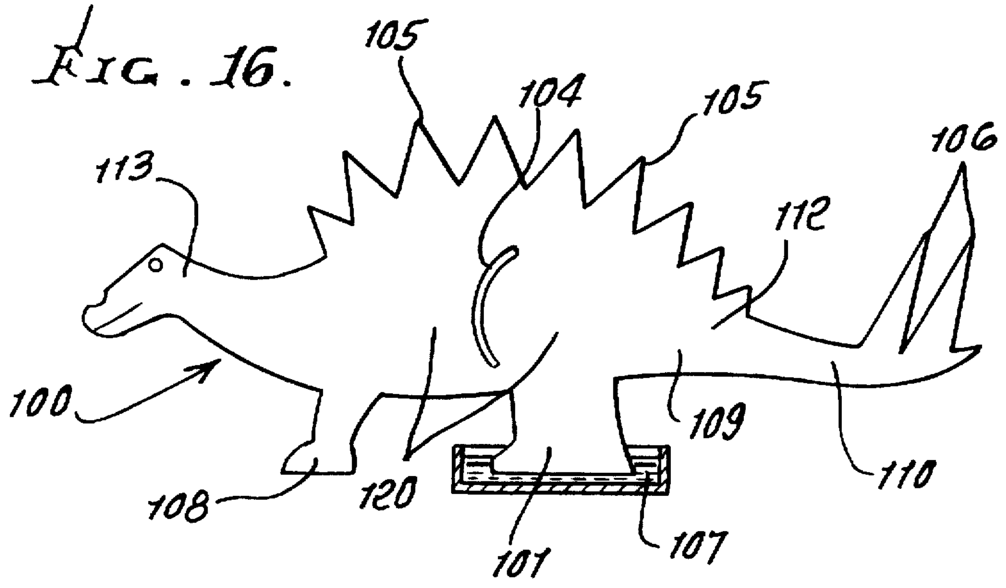
FIG. 16 shows an example of the invention.

An example of modification of means 39 (in FIG. 9) to include control at 45 of portion 41 that contacts the solution 35*a* is seen in FIG. 16. In FIG. 16, a dinosaur shape 100 is shown, with the back legs 101 in the solution 107 and the front legs 108 out of said solution. The result is that the back part 112 of the dinosaur 100 is fed solution more easily than the head portion 113. This makes it harder for chemical growth to occur on the head portion 113, where growth is not wanted, and makes it easier for growth to grow where it is wanted, on the back portion 112.

An example of control at 46 of portion 42 (the intermediate portion that wicks the solution from the first portion 41 to display portion 43 in FIG. 9) is shown in FIG. 16. Here, a cutout 104 is located, which reduces flow from the solution 107 to the front portion 113.

An example of control at 47 of portion 43 in FIG. 9 is also shown in FIG. 16, where growth is controlled by particular locations of triangular "plates" 105 along the back of the dinosaur and spikes 106 on the tail of the dinosaur.

Coloration of the growth can be effected, as described in FIGS. 1–7.

Referring to FIG. 11, locally enhanced crystal growths can be realized by supplemental application of growth solution to various areas of portion 43 (i.e., above the solution source 35*a*), as indicated by arrows 80 and 81. Such application can be effected as by sheet edge dipping onto the solution, or by brushing or swabbing of solution onto the sheet or its edges.

Figure 14:
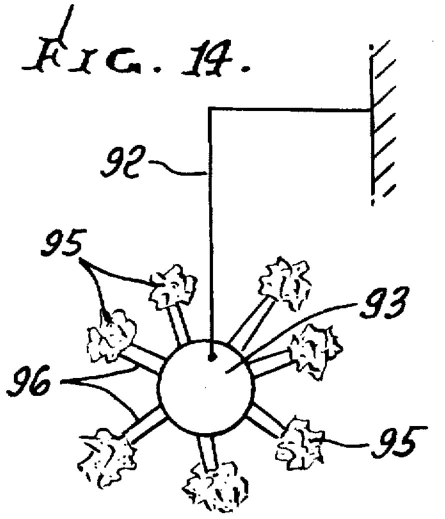
FIGS. 14 and 15 show suspension and pedestal support of wicking sheets with barriers.
Figure 15:
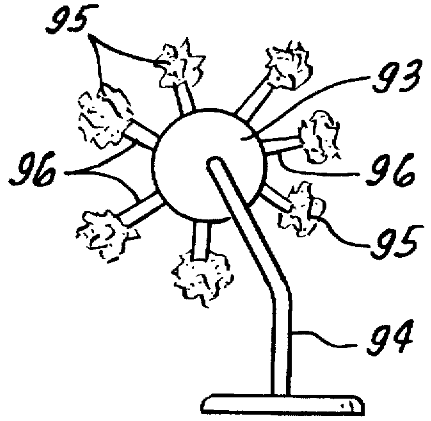

FIGS. 14 and 15, respectively, show support for the display portion 93, but, unlike the previous configurations, absent are the wicking portion, shown in FIG. 9 at 42 that normally supports the display portion, and portion 41 also shown in FIG. 9. Support means for the display portion 93 in FIG. 14 comprises a suspension string 92. Support means for the display portion 93 in FIG. 15 comprises a pedestal 94. The suspension string 92 and the pedestal 94 may and may not be absorbent to water, but the preferred embodiment is to be of a nonabsorbent material.

The display portion 93 is an absorbent artistic support for the growths 95. The solution is applied to the display portion 93 in various means that are "direct application of solution". The various means comprise dabbing (with a saturated cotton swab) or painting the solution onto the display portion 93 by immersing the display portion 93 into the solution. The solution is wicked to the extremities 96 of the display portion 93 where the water of the solution evaporates and the growths form. If the evaporation is interfered with, there is less growth or no growth, depending on the extent of the interference.

An additional way to prevent growths on certain parts of the display portion is to cover the parts, where growths are not wanted by nonabsorbent materials. This is a form of a barrier. The nonabsorbent materials comprise polyethylene film and aluminum foil. An example of a location where no growth is wanted is seen in FIG. 11. No growths (fur) are wanted on the head 101 of this animal. A way to prevent growths is to cover the head 101 with a polyethylene sheet 102. The corner of the polyethylene bag can be used. Here, two edges 103 that are sealed make a sleeve that slips over the head 101. The nonabsorbent material is preferably put into place before growths take place and is removed after growths are completed.

SURPRISE EFFECT BY LOCAL APPLICATION OF A MASKING LAYER

Another way to create a surprise effect when using white paper is to dye the absorbent material, as per prior art, and then mechanically cover the dyed tips with a covering or layer of sheet material, as paper, so that one cannot easily see the underlying color of the dyed tips. Said layer may be attached by an adhesive. Instead of the dyed tips being hidden from view by covering the tip with a sheet of paper, the color may be hidden from view by a layer of paint or a layer of printing or silk screen ink. Application means comprise using a brush, by dobbing, by a roller, or by spraying. This layer that functions to mask the tip color from view is termed the "masking layer".

STRING AND PEDESTAL SUPPORTS FOR DISPLAY MEANS

FIGS. 14 and 15, respectively, show support for the display portion 93, but, unlike the previous configurations, absent is the first portion 41, to contact solution 35a. Support means for the display portion 93 in FIG. 14 comprises a suspension string 92. Support means for the display portion 93 in FIG. 15 comprises a pedestal 94. The suspension string 92 and the pedestal 94 may and may not be absorbent to water, but the preferred embodiment is to be of a nonabsorbent material.

The display portion 93 is an absorbent artistic support for the growths 95. The solution is applied to the display portion 93 by various means that are "direct application of solution". Said various means comprise dabbing (with a saturated cotton swab) or painting the solution onto the display portion 93, and by immersing the display portion 93 into the solution. The solution is wicked to the extremities 96 of the display portion 93, where the water of the solution evaporates and the growths form. If the evaporation is interfered with, there is less growth or no growth, depending on the extent of the interference.

GROWTH PREVENTION OF SELECTED PARTS OF THE DISPLAY PORTION

It has been found desirable to prevent the chemical growths from forming on selected parts of the display portion. A way that this can be accomplished is to create appropriate growth barriers at locations where chemical growths are not wanted.

REMOVABLE SLEEVE TO PREVENT CHEMICAL GROWTHS

One of many ways to prevent growths on selected parts of the display portion is to cover the part where growth is not wanted by nonabsorbent material. This is a form of a barrier. It operates by preventing evaporation of the solution, and hence prevents growth. Nonabsorbent materials comprise plastic and metallic films, as polyethylene film and aluminum foil. An example of a location where no growth is wanted is in FIG. 11. No growths (fur) are wanted on the head 101 of this representation of an animal. A way to prevent growth is to cover the head 101 with a polyethylene sheet 102, which partially or completely encloses the head; this may be termed "a removable sleeve". The corner of a polyethylene bag can be used; here, two edges 103 are sealed; and it makes a sleeve that slips over the head 101. The nonabsorbent material is preferably put into place before growths begin and is removed after growths are completed.

EXPLANATION OF RESINS AND NONRESINS

As used within this application, the term "resin" describes materials, when at 24° C., are any of numerous clear to translucent, yellow or brown, solid or semi-solid, viscous substances of plant origin, such as copal, rosin, and amber.

Also, any of numerous physically similar polymerized synthetics or chemically modified natural resins, including thermoplastic materials, such as polyvinyl, polystyrene, and esters, epoxies, and silicones. The preferred resin here, for use as a barrier, is Foral-85 (a derivative of rosin), a product of Hercules, Inc., of Delaware, N.J. This material may be applied by dissolving in any one of many suitable solvent, will known to a person skilled in the art.

As used within this application, the term "nonresin" describes materials, when at 24° C., that fall outside of the above definition for the term resin and are liquid at 24° C. An example of such a material is anethole, also known as anise camphor. It is an oily substance, has the aroma of anise, and is the principal constituent of fennel. It is practically insoluble in water.

FRAGRANCE DESIRABLE

It is desirable to add fragrance to the prior art of chemical growth display means. Two classifications of fragrant materials have been discovered in which some retard and some do not retard chemical growths.

FRAGRANCE WITH GROWTH PREVENTION

It is desirable to find a method of preventing chemical growths and at the same time imparting fragrance to the display apparatus. It has been discovered that a certain material, when applied to selected locations on the display apparatus, both prevent or block chemical growths, and at the same time impart fragrance to the display means. This material is exemplary of other materials that can be used with the same result. It is desirable that material be applied to the head 113 of the dinosaur in FIG. 16 that is a barrier to chemical growth and imparts fragrance. Such a material is anethole; and it is essentially insoluble in water. Anethole imparts the fragrance of anise and is the principal oil of fennel; and it may be applied full strength above 24° C. Methods of applying anethole to the display portion comprise immersing the display portion into the material, or in applying anethole to the display portion by painting, swabbing, or silk screening. Means of preventing chemical growths, as by blocking, may be partially or completely effective.

FRAGRANCE WITHOUT GROWTH PREVENTION

It has also been found desirable to find a method of not preventing chemical growths, and at the same time imparting fragrance to the display apparatus. Here, the chemical growths on the display portion are not to be significantly stopped nor slowed down. Because practitioners of the prior art have found that small changes in the chemistry involved in creating the chemical growths in air have a profound effect on the abundance of the chemical growths, and in their character, it would be expected that materials, when applied to the intermediate portion (which function of said portion is to facilitate movement of solution, which is capable of making chemical growth, to the display portion), would significantly change the rate at which the chemical growths take place, as well as the character of the growths.

Contrary to expectations, it has been found that certain materials have been discovered that, when applied to selected locations on the display apparatus, neither significantly prevent nor retard chemical growths, and at the same time impart fragrance to the display. Materials that impart fragrance to the display apparatus, as well as having the properties of not interfering significantly with the rate and size of the chemical growths, have been discovered. Examples are: Fir Needle Oil, available from J. Manheimer, Inc., Long Island City, N.Y. 11101, and Grape Fragrance, A-4857, available from American Aromatics, Inc., Manhasset, N.Y. 11030.

Examples as to how these fragrances, which do not interfere with the chemical growths, may be applied follow: The material may be applied to the center area 120 of the body of the dinosaur of FIG. 16, and throughout the center section 18 of the tree in FIG. 1. (These areas correspond to the second, or intermediate, portion of the display means 39.) These materials impart fragrances to the environment by evaporation; and, in order to delay this evaporation until the end user opens the package, it is desirable for aromatic materials to be packaged within envelopes or sheets or bags or pouches, to retard evaporation until wanted. Sheet material that can be used includes polyethylene, polyester, and metal foil.

FRAGRANT AUXILIARY STRUCTURE

Figure 17:
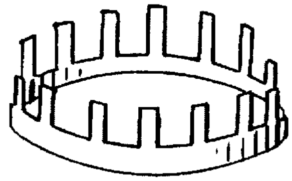
FIG. 17 is a perspective view of an aromatic device.

It is desirable to have an auxiliary structure that is used in conjunction with the display means 39 wherein said auxiliary structure is impregnated with an aromatic material resulting in an "auxiliary aromatic structure". For example, one form of an auxiliary aromatic structure (of an infinitude of forms that might be used) is a "circular picket-like fence" that could be impregnated with a fragrant material and placed as a circle around the tree shape of FIG. 3. The circular picket-like fence might appear as in FIG. 17. This is a case when the fragrance location is not in the pathway of the solution as it travels from the first portion to the third portion of the display means 39. When this structure is placed around, or near the display means, the fragrance it imparts to the environment creates the illusion that the display means is responsible for the fragrance.

The design of the auxiliary aromatic structure is such that it enhances and embellishes the artistic and esthetic appearance of the display means. An example would be a picket-like fence, as previously described, impregnated, for example, with fir needle oil. When placed around the tree configuration shown in FIG. 3, there is a strong mental association between the tree shape and the fragrance of the auxiliary aromatic structure creating an illusion that the fragrance is coming from the tree.

Another form of an auxiliary aromatic structure is shown in FIG. 5 where an absorbent material 202 in the form of a sleeve is placed around the tube 28. Absorbent material 202 is impregnated with a fragrant material, as for example fir needle oil. This auxiliary aromatic structure creates the illusion that the fragrance is originating from the chemical growths on the display.

ENCAPSULATED FRAGRANCE

It is desirable to find a method of imparting fragrance to the display means 39 without adding fragrance to the display structure before the first portion is placed in contact with the solution. A method has been discovered to accomplish this. This method is by the use of encapsulated fragrances; these encapsulated fragrances are grains or granules that are roughly spherical in shape (and might be 0.5 mm in diameter) and composed of a material that is a barrier to the evaporation of the fragrances trapped within them. It is required that the encapsulating material is soluble in water.

As an example of one way in which this invention may be employed is by using encapsulated fragrance grains mixed with the package of chemical granules. The advantage of using encapsulated fragrances is that no exterior package that is a barrier to fragrance evaporation is required. One need only mix the encapsulated granules with the chemical granules. When this mixture is mixed with water, the encapsulating material softens and dissolves, and the fragrant material within starts to evaporate. An example of encapsulated granules is Encapsulated Lemon Oil, Lot 9218, obtained about 1984, from Hagelin & Company, Inc., 241 Cedar Knolls Road, Cedar Knolls, N.J. 07927.

FASTER GROWTH WITH BARREN TIPS

Time is of the essence, and the shorter the waiting period for growths to appear, the better. It takes as little as 15 minutes for the first chemical growths to appear on the spikes on the back of the dinosaur of FIG. 11. The tail takes longer. Initially, the entire tail of the dinosaur (aft of 109) was dyed. It was found that the time for chemical growths to appear on the tips of the spikes 106 on the tail was reduced if, instead of dyeing the entire tail of the dinosaur aft of 109, only part of the tail was dyed (between 109 and 110), and the tips being barren of dye.

The initial color of the growths may be white, but the zone of dye located between 109 and 110 bleeds, and in time colors the growths at the tips of the spikes 106. This discovery is a generic one and may be described as "a means to shorten the time required for growth to appear"; and it is accomplished by locating a zone of dye between the solution source and the extremities upon which chemical growths occur, said extremities being barren of dye.

I claim:

1. In a method of displaying chemical growths and employing means having a first portion for contacting a solution capable of forming said growths when the solution is dried, said means also having an intermediate portion for feeding said solution by wicking action from said first portion, and said means also having a display portion to which said solution is fed from said intermediate portion on which said growths form when the solution is fed thereto and dried, for displaying the growths, the improvement that includes modifying at least one of said portions to control at least one of the following:

i) said contacting of the solution ii) said feeding of the solution iii) said displaying of the growths.

2. The method of claim 1, wherein said modifying includes providing barrier means on a part of at least one of said portions.

3. The method of claim 2 including providing a display element on said display portion, said barrier means located to block feeding of said solution to said display element.

4. The method of claim 2 wherein said barrier means comprises a nonwicking substance.

5. The method of claim 2 wherein said barrier means is provided at a localized part of said intermediate portion.

6. The method of claim 2 wherein said barrier means is provided in the form of a cutout.

7. The method of claim 2 including extending said barrier means to an edge of said display portion.

8. The method of claim 7 wherein said barrier means is provided by dipping said edge into a liquid pool of said barrier means.

9. The method of claim 2 wherein said barrier means is provided in the shape of a stripe.

10. The method of claim 1 wherein said means to display chemical growths is provided in the form of at least one sheet.

11. The method of claim 10 wherein said sheet is provided to have the shape of one of the following:

a) a tree b) a bush c) an animal d) a fish e) a snowflake.

12. The method of claim 1 wherein said solution consists essentially of an alkaline salt, ammonia and water.

13. The method of claim 1 wherein said modifying step includes applying additional of said solution to said intermediate portion to enhance feeding of said solution to said display portion.

14. The method of claim 13 wherein said additional solution is applied to said intermediate portion by at least one of the following:

a) brushing b) swabbing c) dipping into said solution.

15. The method of claim 1 including supporting said means by at least one of the following:

a) suspending said means, b) mounting said means on a pedestal.

16. In means to display chemical growths, and having a first portion for contacting a solution capable of forming said growths when the solution is dried, said means also having an intermediate portion for feeding said solution by wicking action from said first portion, and a display portion to which solution is fed from said intermediate portion and on which said growths form when the solution fed thereto is dried, for displaying the growths, the improvement comprising modifying means associated with at least one of said first, intermediate and display portions for controlling at least one of the following:

i) said contacting of the solution ii) said feeding of the solution iii) said displaying of the growths.

17. The means to display chemical growths of claim 16 wherein said modifying means comprises barrier means located on a part of at least one of said portions.

18. The means to display chemical growths of claim 17 wherein said barrier means is localized on part of said display portion, whereby said growths may form on a remainder of said display portion.

19. The means to display chemical growths of claim 17 including a display element on said display portion, said barrier means located to block feeding of said solution to said display element.

20. The means to display chemical growths of claim 16 wherein said means to display chemical growths comprises at least one sheet.

* * * * *